United States Patent Office 3,605,931
Patented Sept. 20, 1971

3,605,931
HYDROSTATIC DRIVE SYSTEM FOR A VEHICLE
Donald Firth and Roger Harvey Yorke Hancock, East Kilbride, Glasgow, and Derek Mitchell, Larkhall, Scotland, assignors to National Research Development Corporation, London, England
Filed Dec. 6, 1968, Ser. No. 781,925
Claims priority, application Great Britain, Dec. 11, 1967, 56,254/67
Int. Cl. B60k *17/30*
U.S. Cl. 180—43R          5 Claims

ABSTRACT OF THE DISCLOSURE

A hydrostatic drive system for a vehicle in which a hydraulic motor is mounted in the steerable vehicle wheel or immediately adjacent the vehicle wheel and movable with it. The system includes a conduit for conveying fluid from an engine driven pump to the motor via a fluid coupling. The fluid coupling is preferably in the form of a ball joint having a swivel axis substantially aligned with the steering or king pin axis of the wheel.

---

This invention relates to a hydrostatic drive system for a vehicle, of the type in which a pump supplies presurised fluid to a motor located so as to move with a wheel, the wheel being carried by a suspension system allowing controlled movement of the wheel, or being steerable, or both.

It is a problem in such a system that flexible fluid conduits, when used to convey the fluid to the motor, tend to become rigid under the influence of the high fluid pressures which are commonly used in hydrostatic pump/motor transmission systems, and this interferes with the steering when the flexible conduit extends all the way to the motor. To a lesser extent the rise and fall of the wheel upon the suspension is interfered with also.

According to the invention there is a hydrostatic drive system for a vehicle in which a hydraulic driving motor is located so as to move with a wheel, the system including means for conveying fluid under pressure to the motor, the means comprising a swivel fluid coupling. With this arrangement a conduit conveying the fluid is not substantially deformed by movements of the wheel suspension or in the case of a steerable wheel by steering motions of the wheel.

Preferably, in the case of a steerable wheel, the swivel fluid coupling has its swivel axis substantially aligned with the steering or king pin axis of the wheel.

Preferably the swivel coupling comprises a ball joint.

Preferably the coupling is housed in at least one of the steering pivot joints and the conduit comprises, for the part if its length adjacent to the coupling, a channel running along a swinging link of the wheel suspension system.

Alternatively however, the said adjacent part of the conduit is a flexible pipe which is bent by up and down suspension motions of the wheel relative to the chassis of the vehicle but not substantially bent by steering motions of the wheel, because of the swivelling action of the coupling.

Illustrative embodiments of the invention are illustrated in the accompanying drawings, in which:

FIG. 1 shows a swivel joint suitable for incorporation in a wheel steering swivel of the type having no king pin proper but in which the stub axle body is pivotally jointed at two points, one at the top, one at the bottom, to the outer ends of upper and lower "wish bones" extending transversely from the main frame of the vehicle.

Figure 1:
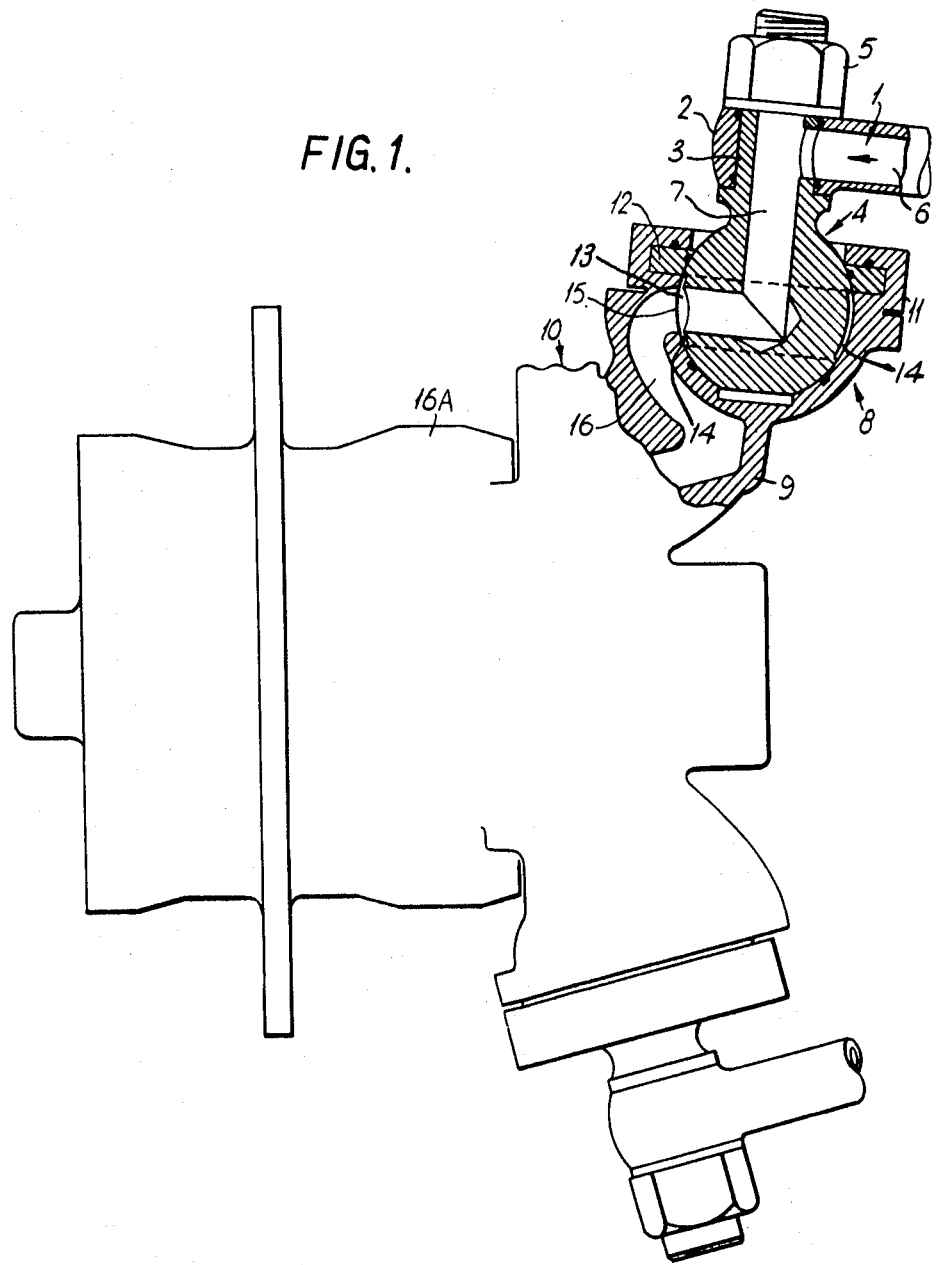
FIG. 1 illustrates a first form of swivel joint, partially in section, as embodied in a system in accordance with the present invention.

A hollow upper wish bone limb 1 acts as a pressurised fluid conduit leading from an engine-driven pump.

The knuckle-end 2 of limb 1 fits over an upwardly-extending spigot 3, integral with a ball element 4 and is secured to spigot 3 by a nut 5. The bore 6 of limb 1 communicates with a passage 7 running centrally down spigot 3 into the ball element 4.

Ball element 4 is housed in a part-spherical socket 8 in an upwardly extending limb 9 forming part of a stub axle body 10.

Socket 8 is provided with a retaining ring 11 and a sealing ring 12 which retain ball element 4 in place.

Passage 7 turns through a right angle and emerges at an outlet 13 in the equatorial region of ball element 4 and there is a groove 14 in this region around the full circumference.

Opposite outlet 13, there is an opening 15 into a duct 16 running through the stub axle body 10 and terminating in an hydraulic motor 16A (shown in outline only), mounted on a stub axle extending from body 10.

The groove 14 serves to equalise the fluid pressure all round the ball element 4 so that it is not forced to the right by the pressure of the fluid at outlet 13. Without this precaution ball element 4 might be locked by friction in socket 8 so that the stub axle body 10 could not be rotated about the steering swivel axis.

The pressurised fluid may be introduced into limb 1 at its inboard end by a swivel coupling similar to that illustrated in FIG. 1 but as this is subjected only to the rise and fall motions of the wheel suspension and not to steering motions, it is possible to use a flexible pipe for the purpose.

It is necessary to have both "go" and "return" conduits for the pressurised fluid and another conduit may be provided in an arrangement such as that described in relation to FIG. 1 by providing a similar swivel coupling at the lower steering swivel joint and using a lower wishbone member as the return conduit.

Figure 2:
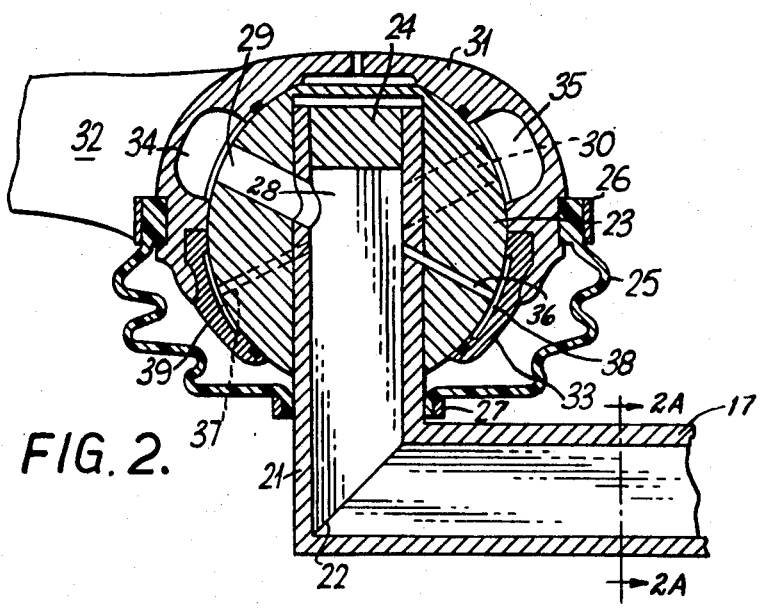
FIG. 2 illustrates a second form of swivel joint.

FIG. 2 shows an alternative form of flexible coupling and is described in the context of a system wherein the pressurised fluid passes along a track rod or analogous member of the steering linkage. This figure also illustrates an arrangement wherein the go and return fluid conduits both pass through the same member and through the same swivel coupling.

Figure 2A:
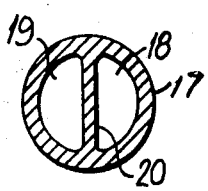
FIG. 2A is a cross-section taken on the line 2A—2A in FIG. 2 throught the hollow track rod included in the arrangement illustrated in FIG. 2.

A hollow track rod 17 has two bores 18 and 19 of "D" cross section, separated by a diametral web 20 which defines and separates the go and return fluid conduits, as shown in FIG. 2A. Another short section 21 of similar tube is welded to track rod 17 at 22 to make a right-angle branch which passes down a hollow central bore of a ball element 23, into which it is a shrink fit tight enough to provide a seal against leakage.

The bores 18 and 19 are continued, through the joint at 22, in the form of similar D section passages through the branch 21 and these passage lie over one another in FIG. 2. The ends of these passages are plugged individually and one of them, 28, as shown in the drawing is plugged at 24. The passages join drillings from the upper quadrant of ball element 23, which drillings run obliquely radially of the ball element 23. One drilling 29, which joins passage 28 is drilled from the left, and the other is drilled from the right and is shown in dotted lines. Passage 28 and drilling 29 are shown in firm lines in FIG. 2, although strictly speaking the section plane would pass through the dividing wall between the two passages and drillings. The other drilling 30 is shown in dotted lines.

Figure 2B:
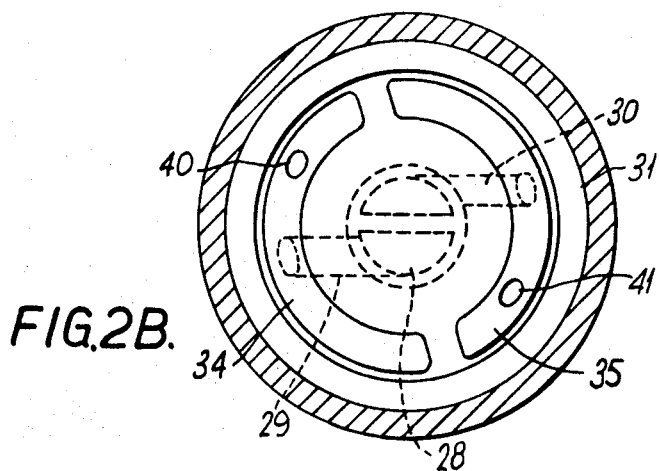
FIG. 2B is a schematic representation of the relative dispositions of certain grooves and passages included in the arrangement illustrated in FIG. 2.

Ball element 23 is housed in a part-spherical socket 31 in a steering arm 32 integral with a stub axle body (not shown). A cap 33 secures ball element 23 in socket 31. Socket 31 has two grooves 34 and 35 running around an upper parallel of latitude of its part-spherical surface and these grooves are separated from one another at their ends, as shown in inset FIG. 2B, the relative positions of the passages and drillings of ball element 23 and branch 21 being superimposed in dotted lines.

Each of the drillings 29 and 30 is extended across the centre of ball element 23 in the form of smaller diameter drillings 36, 37 respectively. Cap 33 has pockets 38 and 39 machined in its inner surface over areas corresponding to grooves 34 and 35 and the pressurised fluid conveyed to these by drillings 36 and 37 serves to balance the forces across the diameters of ball element 23 arising from the pressure at the grooves 34 and 35 respectively.

Grooves 34 and 35 have outlets 40 and 41 communicating with passages (not shown) which run through the steering arm 32 to a hydraulic motor (not shown) mounted on the stub axis (not shown).

A glove 25 is secured to socket 31 by a clip 26 and to branch 21 by a clip 27.

Where track rod 17 runs across between two wheels at one end of the vehicle, pressurised fluid may be supplied to it via two flexible pipes one communicating with each of the bores 18 and 19 and the same may be done separately for each of two track rod elements joining the ends of the rack bar of a rack and pinion steering box. Alternatively, the inboard elements of the track rod elements may each be provided with a swivel joint, as shown in FIG. 2, at its inboard end where it joins the end of a steering rack bar, pressurised fluid being supplied to the rack bar by suitable ports within a bore in the steering box.

Figure 3:
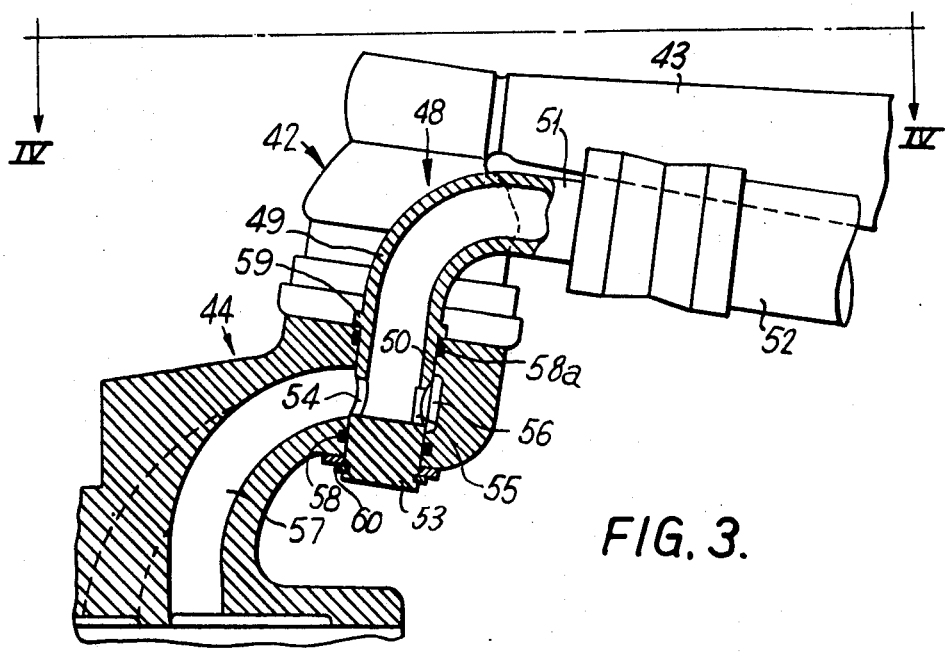
FIG. 3 illustrates a third form of swivel joint, partially in section.
Figure 4:
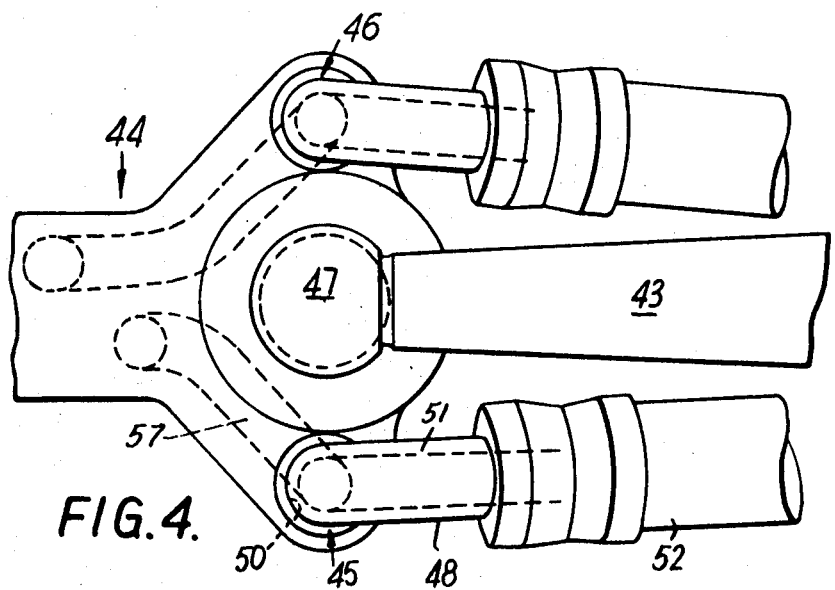
FIG. 4 is a view in the direction IV in FIG. 3.
Figure 5:
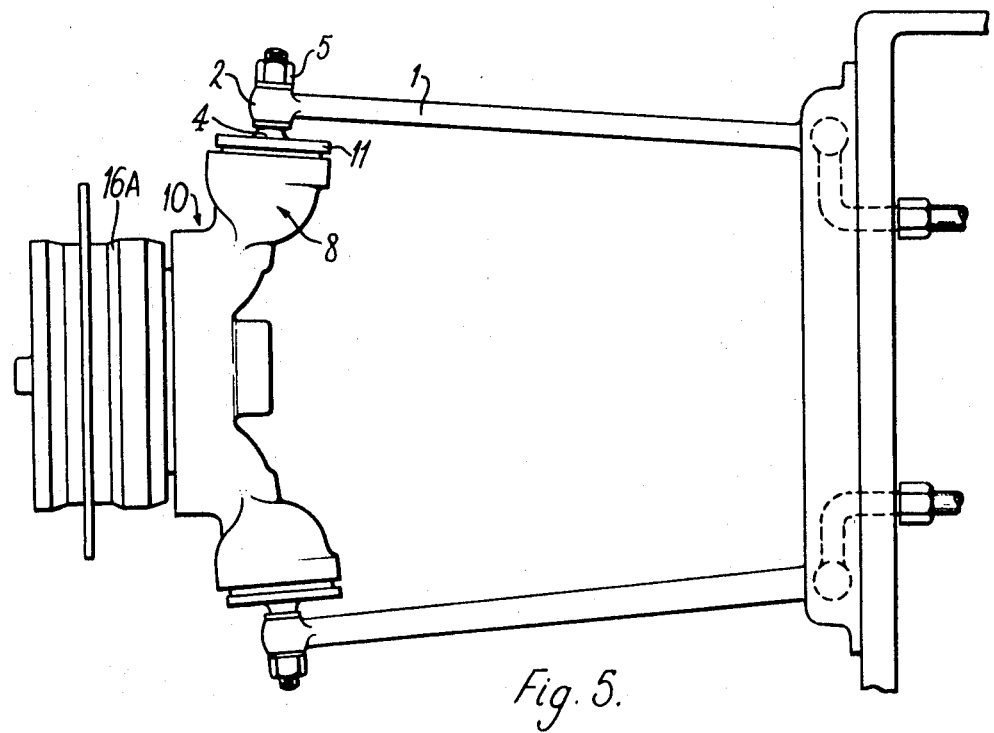
FIG. 5 is a side elevational view of a vehicle suspension system which includes the swivel joint shown in FIG. 1.
Figure 6:
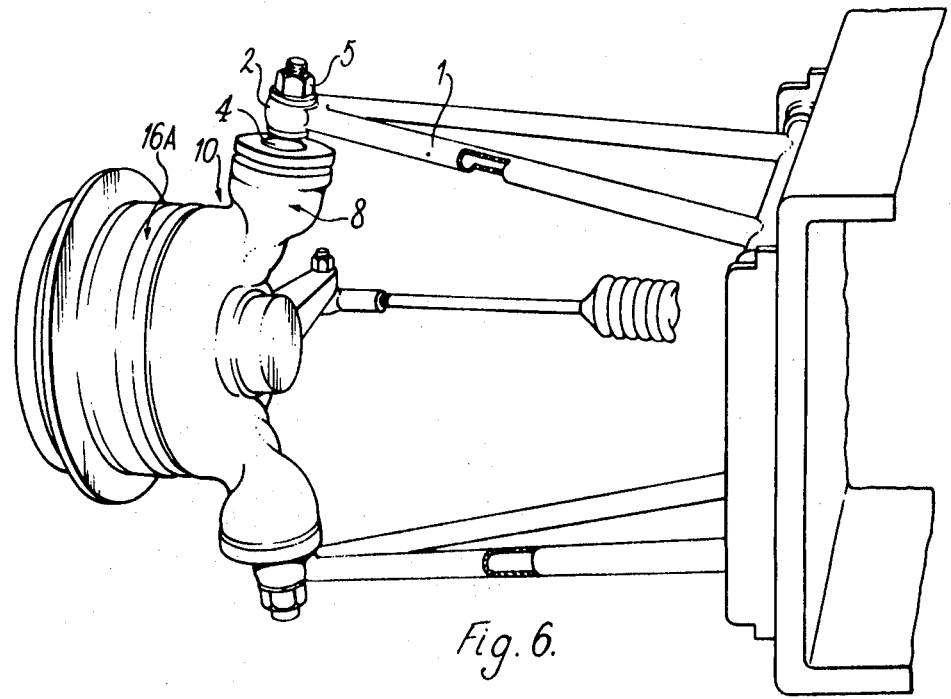
FIG. 6 is a perspective view of the vehicle suspension system of FIG. 5.

FIGS. 3 and 4 show a simplified embodiment of the invention in which an upper steering pivot 42 comprises an upper wish-bone limb 43 swivel-jointed to an upwardly extending limb 44 (similar to limb 10 of FIG. 1) integral with a stub axle body not shown.

As seen in plan in FIG. 4, the upper part of limb 44 is widened to accommodate a pair of swivel couplings generally indicated at 45 and 46 on either side of the steering pivot axis 47.

These two swivel couplings are identical and only one (45) is described.

A tube 48 is bent through a right-angle, a vertical leg 49 entering a bore 50 in limb 44 and a horizontal leg 51 being joined to the outboard end of a flexible pipe 52 leading from a union (not shown) on a fixed part of the vehicle chassis, which is supplied with pressurised fluid from an engine-driven pump. Alternatively the inboard end of the flexible pipe 52 may be connected directly to the pump.

The end of vertical leg 49 of tube 48 is plugged at 53 and further up is pierced with diametrically opposite holes 54, 55 which put the bore of tube 48 into communication with a circumferential groove 56 in the bore 50. Groove 56 is joined by a passage 57 running through limb 43 to the motor (not shown) mounted on the stub axle (not shown).

Bore 50 is grooved above and below groove 56 to receive ring seals 58, 58a and leg 44 is retained in bore 50 by means of a shoulder 59 at the top and a spring ring 60 at the bottom.

We claim:
1. In a hydrostatic drive system for a vehicle in which a hydraulic motor is mounted on the wheel axle of a steerable wheel of the vehicle so as to be movable with the wheel, and which includes a conduit means for conveying fluid from a source to said hydraulic motor by way of a ball and socket fluid coupling having a swivel axis substantially aligned with the steering axis of the wheel, the improvement comprising
   a passage through the ball portion of said fluid coupling for carrying fluid under pressure through the fluid coupling, said passage having an inlet communicating with a fluid flow in said conduit means from said source and an outlet communicating with fluid flow in said conduit means to said hydraulic motor,
   a groove formed in the surface of said ball portion about a complete circumference thereof, said groove being positioned to intersect fluid flow from the outlet of the ball portion so that pressure is equalized within the socket portion of the fluid coupling, thereby preventing a locking of said fluid coupling from fluid pressure.

2. A system according to claim 1 and in which the wheel is carried by a suspension system allowing controlled up and down movements of the wheel.

3. The improvement of claim 2 wherein said suspension system includes a swinging link, and wherein at least a portion of said conduit means for supplying fluid to said motor by way of said ball and socket joint is included in said swinging link.

4. A system according to claim 1 wherein said wheel is supported by suspension means comprising upper and lower suspension members each connected to said motor by said ball and socket fluid couplings, said conduit means including a conduit for supplying fluid to said motor and forming part of one of said suspension members, and including means for the return of said fluid from said motor through the other of said suspension members.

5. In a hydrostatic drive system of the type in which a fluid is delivered under pressure to a hydraulic driving motor associated with a steerable wheel of the vehicle, and wherein said wheel is supported by a suspension means having a ball and socket joint and a swinging link for supporting said wheel for controlled up and down movement thereof, said system further having a conduit means, which includes said ball and socket joint, for delivering fluid to said motor, and a fluid channel contained within said swinging link for delivering fluid to said motor, the improvement comprising
   a passage included in the ball of said ball and socket as part of said conduit means to allow delivery of fluid therethrough, and
   a groove formed about the equator of said ball, with the outlet of said passage intersecting with said groove so that fluid pressure within said socket is substantially equalized.

References Cited
UNITED STATES PATENTS

| | | | |
|---|---|---|---|
| 2,353,730 | 7/1944 | Joy | 180—66(F) |
| 2,558,562 | 6/1951 | Hutton | 180—45 |
| 3,225,855 | 12/1965 | Sherwen | 180—43 |
| 3,469,646 | 9/1969 | O'Connor | 180—66(F)X |
| 3,480,099 | 11/1969 | Nighswonger et al. | 180—44(M) |

A. HARRY LEVY, Primary Examiner

U.S. Cl. X.R.

180—66F; 287—87